Jan. 19, 1932.  T. N. DE BOBROVSKY ET AL  1,842,250
AEROPLANE
Filed April 10, 1928    6 Sheets-Sheet 1

INVENTORS
TEODORO NICOLO DE BOBROVSKY
ERMANNO PARENZAN
BY
ATTORNEYS

Patented Jan. 19, 1932

1,842,250

UNITED STATES PATENT OFFICE

TEODORO NICOLO DE BOBROVSKY, OF BUDAPEST, HUNGARY, AND ERMANNO PARENZAN, OF TRIESTE, ITALY

AEROPLANE

Application filed April 10, 1928. Serial No. 268,894.

This invention relates to improvements in aeroplanes and has particular reference to an aeroplane of the type employing helicopter propellers.

An object of the invention is to provide an improved aeroplane capable of sustained flight wherein the currents of air created by the helicopter propellers are utilized to lift the aeroplane in a vertical directon and thereafter to drive the machine in a horizontal plane.

Another object is to position the wings of the aeroplane beneath the propellers and provide for adjustments thereof whereby, when the machine is rising vertically, said wings will offer a minimum resistance to the air currents from said propellers and when the desired elevation is obtained can be moved to present varying areas of their surfaces to said currents to enable the aeroplane to be propelled in a horizontal direction.

Another object is to assist in maintaining the aeroplane in equilibrium during vertical flight by the manipulation of sets of substantially vertically disposed wings which may be adjusted to offer varying degrees of resistance to the air current produced by a helicopter propeller.

A further object is to provide certain wings of the aeroplane with ailerons which, while the wings are in substantially vertical positions, may be adjusted to secure stabilization of the aeroplane relative to any turning movement thereof about its longitudinal axis.

A still further object is to control the position of the aeroplane relative to a turning movement about a vertical axis by the use of a rudder located below one of the propellers and mounted for adjustment about a horizontal shaft.

The inventive idea involved is capable of receiving a variety of mechanical expressions, one of which, for purposes of illustration, is shown in the accompanying drawings, wherein—

Figure 1:
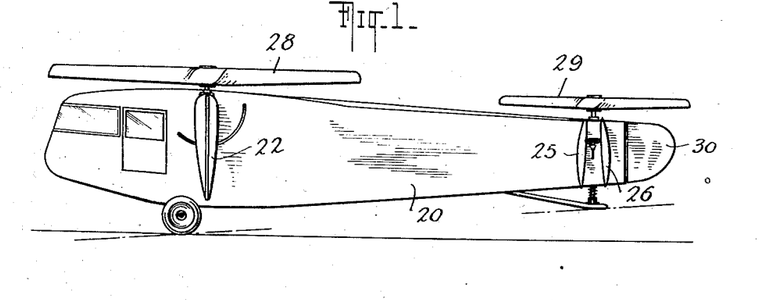
Figure 1 is a side elevation of an aeroplane constructed in accordance with the invention.
Figure 2:
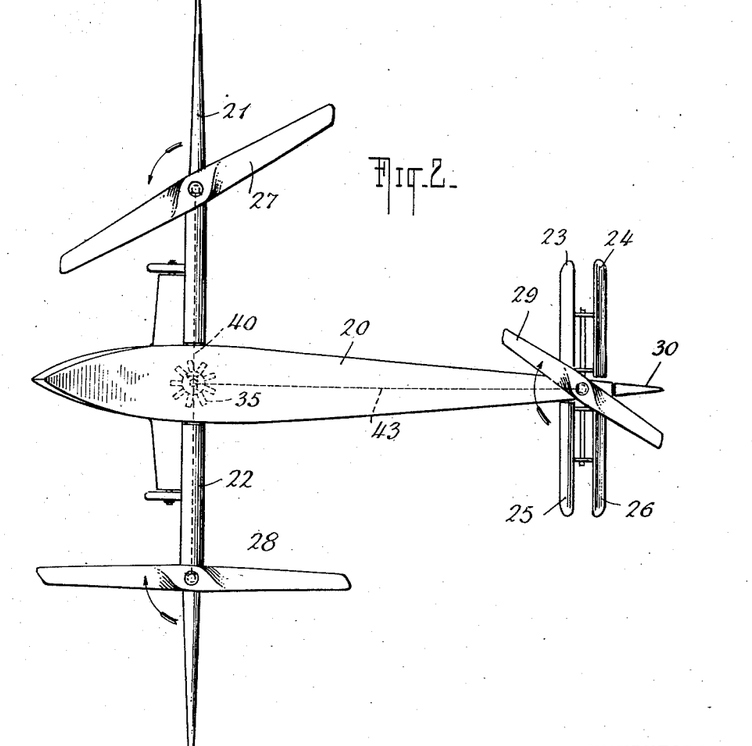
Figure 2 is a top plan view thereof.
Figure 3:
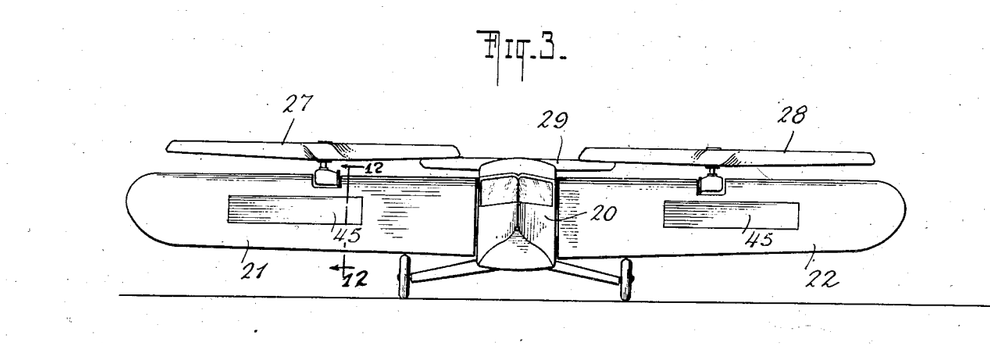
Figure 3 is a front elevation.

Referring more particularly to the accompanying drawings, the aeroplane is shown as comprising a fuselage 20 which, generally speaking, may be of any approved type in use at the present time. In accordance with the present invention, it is proposed to provide means whereby the aeroplane may be propelled from the ground in a vertical plane and after attaining the desired elevation may be driven in a horizontal plane by utilizing the same means employed to elevate it in combination with other elements, such as the wings of the aeroplane. To this end, the invention comprises, briefly, a pair of large front wings 21 and 22 extending laterally from opposite sides of the fuselage 20 adjacent the nose or forward end thereof, and two sets of smaller rear or tail wings 23, 24 and 25, 26, also supported on opposite sides of the tail of the fuselage and in lateral positions relative thereto. Supported above the front wings 21 and 22, respectively, are the helicopter propellers 27 and 28 driven in opposite directions, as indicated in Figure 2, while mounted above the tail of the fuselage 20 and the sets of wings 23 to 26 is a rear helicopter propeller 29. The axis of rotation of this propeller is shown as being centrally located with respect to the sides of the fuselage and in line with the longitudinal axis thereof, but it will be understood that, in order to compensate for any side drift of the tail of the fuselage, which may be occasioned by the direction of revolution of the propeller 29, the axis of said propeller may be shifted slightly to either side of the longitudinal axis of the fuselage depending upon the direction of revolution of said propeller. Further, the aeroplane is provided with a tail rudder 30 mounted for rotary adjustment about the horizontal and longitudinally extending shaft 31 supported at the rear extremity of the fuselage. This rudder is also situated below the propeller 29 and is designed to utilize the air current from said propeller to steer the aeroplane in horizontal flight and to compensate for any side drift of the tail or other swinging movement of the aeroplane about a vertical axis.

Figure 4:
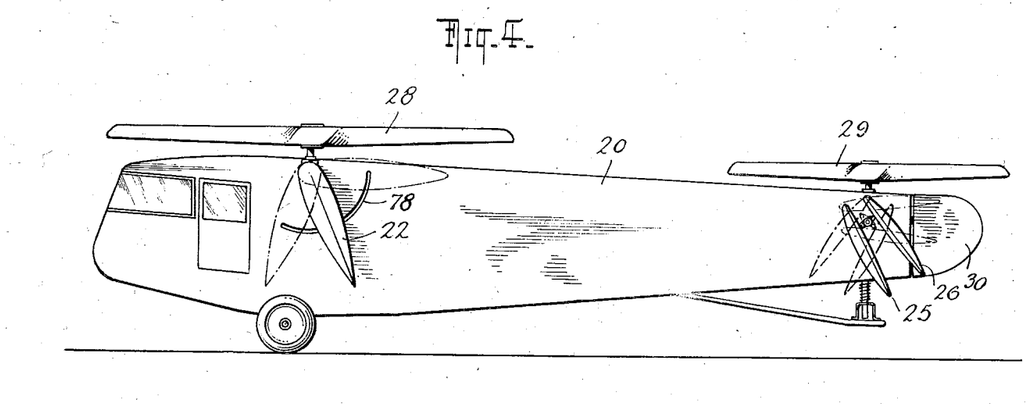
Figure 4 is a side elevation indicating in broken lines various positions or adjustment of the different wings.

The support for each of the front wings 21 or 22 comprises a tubular member or sleeve 32 extending laterally from one side of the fuselage 20 and having its inner end projecting into the fuselage and connected to a centrally located transmission housing 33. The wing supported by each member 32 is suspended therefrom in a vertical position by the formation, in the upper edge of the wing, of a tubular portion 34 which receives the sleeve 32 and about which sleeve the wing is capable of adjustment both forwardly and rearwardly of the vertical plane, as indicated in Figure 4, for purposes which will appear in the course of the description.

Figure 5:
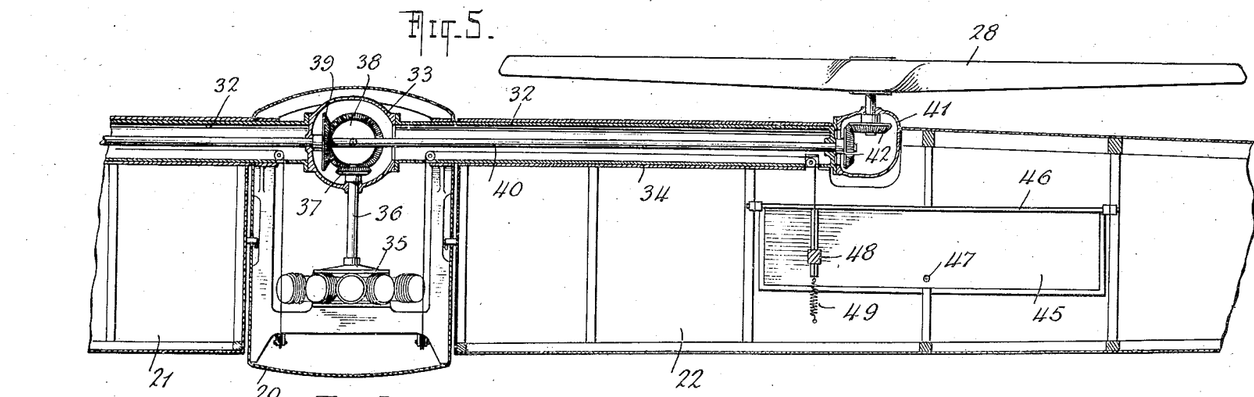
Figure 5 is an enlarged fragmentary longitudinal section through the front wings of the aeroplane, showing the drive for the front propellers.

The drive for the front propellers 27 and 28 is derived from a single source of power, such as the engine conventionally shown at 35. The shaft 36 of the engine extends upwardly into the transmission housing 33 and carries a bevel gear 37 meshing with the gear 38 which in turn drives the gear 39 secured to the shaft 40 extending in opposite directions from the fuselage through the sleeves 32. At each end of the shaft 40 there is provided a housing 41 which supports the adjacent propeller above its associated wing and which contains the gears 42 for imparting rotation from the shaft 40 to the propellers, said gears 42 being such that the propellers on opposite sides of the fuselage will be driven in different directions about their vertical axes.

Figure 6:
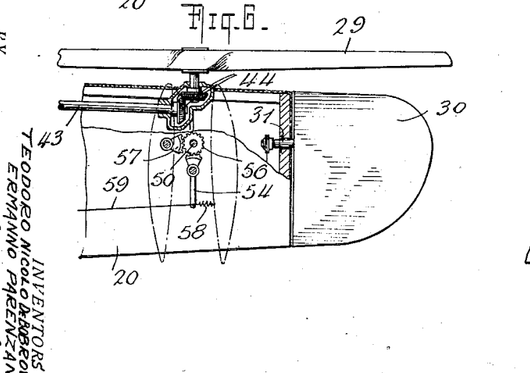
Figure 6 is a fragmentary longitudinal section through the tail of the fuselage showing the drive for the rear propeller.

From the gear 38 there is extended rearwardly toward the tail of the fuselage a longitudinal shaft 43, the rear end of which is coupled with gearing 44 for driving the rear propeller 28 and in this manner the three propellers 27, 28 and 29 are driven in unison from the single source of power 35.

The simultaneous operation of the helicopter propellers is relied upon to elevate the aeroplane from the ground in a vertical direction and during its upward flight various means are utilized to maintain the equilibrium of the aeroplane whereby excessive tilting thereof about longitudinal, vertical and transverse axes is prevented. The primary means utilized to prevent tilting about a longitudinal axis, such as when one of the front wings dips to a plane below the other, comprises a pair of ailerons 45 for each of said front wings, the ailerons of each wing being simultaneously controlled and the pairs of two wings being either simultaneously or individually controlled in a manner to appear in the course of the description. The control of the two pairs of ailerons simultaneously is not used to prevent tilting of the aeroplane, but is employed in other instances, such as when the aeroplane is being landed, the ailerons being then adapted to retard the descent. The ailerons of each pair are supported in the opposed surfaces of the wing with which they are associated and are preferably located intermediate the longitudinal edges of said wing. Each aileron is pivotally carried by a rod 46 having its ends suitably journalled in the wing surface and said aileron is adapted to be moved outwardly toward the dotted line position shown in Figure 12, a spring 47 connecting the pairs of ailerons being adapted to maintain the same in normally closed position. To effect an adjustment of the opposed ailerons of a pair, the inner edges thereof are engaged by a spreader 48 movable transversely of the wing in a manner hereinafter described and being yieldably retained in an inoperative position toward the lower edge of the wing, as viewed in Figure 12, by means of a spring 49. With this construction, should the aeroplane tilt about a longitudinal axis so that one of the wings dips and the other rises, the ailerons of the latter wing are moved outwardly, the extent of such movement being in accordance with the amount of tilt of the machine. In being thus moved, the ailerons will present more or less of their outer surfaces to the stream of air from the propeller associated with the uppermost wing and the pressure of said air against the ailerons will force the wing downwardly until it has reached its proper level whereupon the ailerons may be withdrawn to their normal positions under the influence of the spring 47 and after the spreader 48 has been released to permit of its restoration by the spring 49.

With the rudder 30 in a normal vertical plane, should there by any side drift in either direction of the tail of the fuselage, or, in other words, any turning movement of the fuselage about a vertical axis, the rudder 30 may be turned about its shaft 31 in the proper direction and to the necessary extent to present a sufficient area of one of its surfaces to the stream of air created by the propeller 29 so that the pressure of the air against said rudder will force the tail of the fuselage to move in an opposite direction from that created by the drift. For example, viewing Figure 2 and the direction of flight indicated thereby, should the tail of the fuselage swing to the right, the rudder 30 would be turned to present its right-hand surface to the air current from the propeller 29 with the result that pressure against the rudder would cause the tail to swing toward the left and when its original position is attained the rudder may be then turned into its normal vertical plane. In this same manner the steering of the machine in a horizontal plane may be accomplished.

Figures 7, 8, 9, 11, 12:
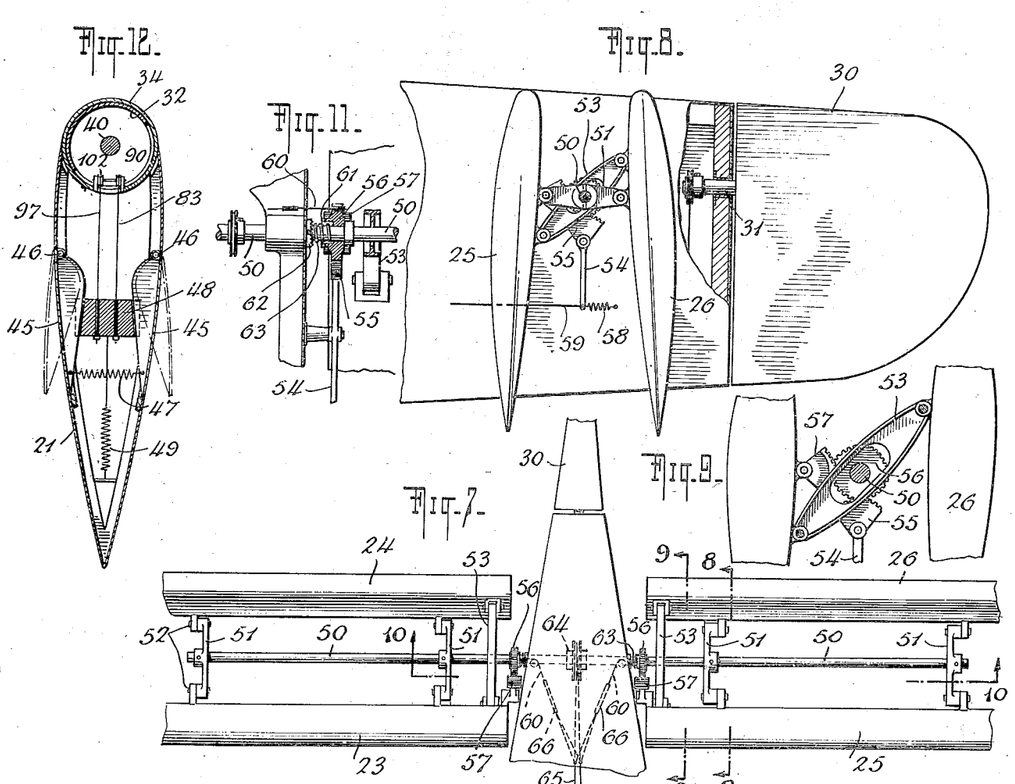
Figure 7 is a fragmentary top plan view of the tail of the aeroplane showing the sets of rear or tail wings and the operating mechanism therefor.
Figure 8 is an enlarged section taken on the line 8—8 of Figure 7.
Figure 9 is a similar section taken on the line 9—9 of Figure 7.
Figure 11 is an enlarged fragmentary section also taken on the line 10—10 of Figure 7, illustrating in more detail the control mechanism for one of the rear sets of wings.
Figure 12 is a vertical transverse section through one of the front wings taken on the line 12—12 of Figure 3.
Figure 10:
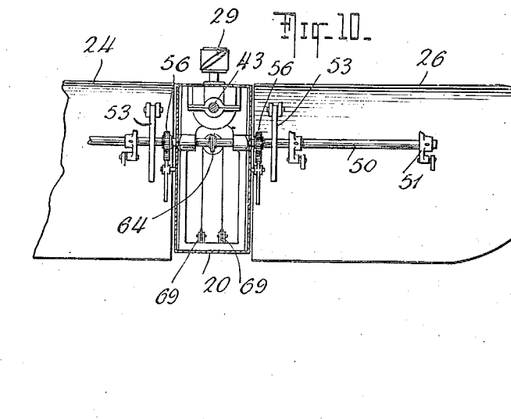
Figure 10 is a section on the line 10—10 of Figure 7.
Figure 13:
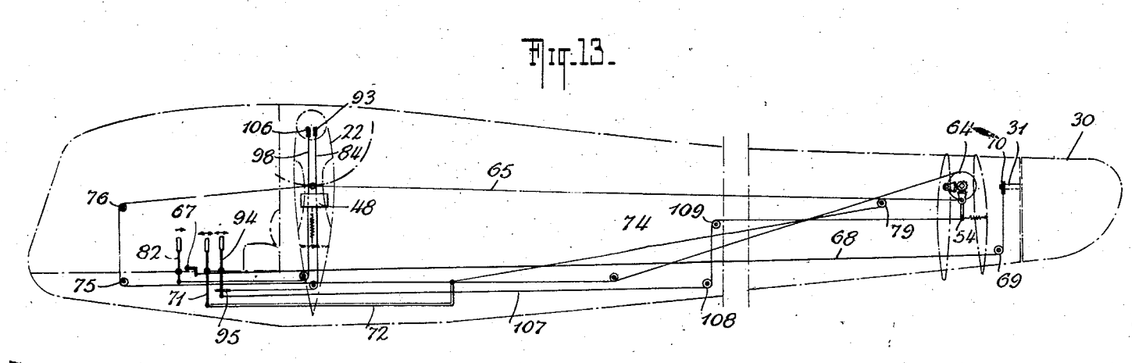
Figure 13 is a diagrammatic side elevation, illustrating the various controls for the wings and rudder.
Figure 14:
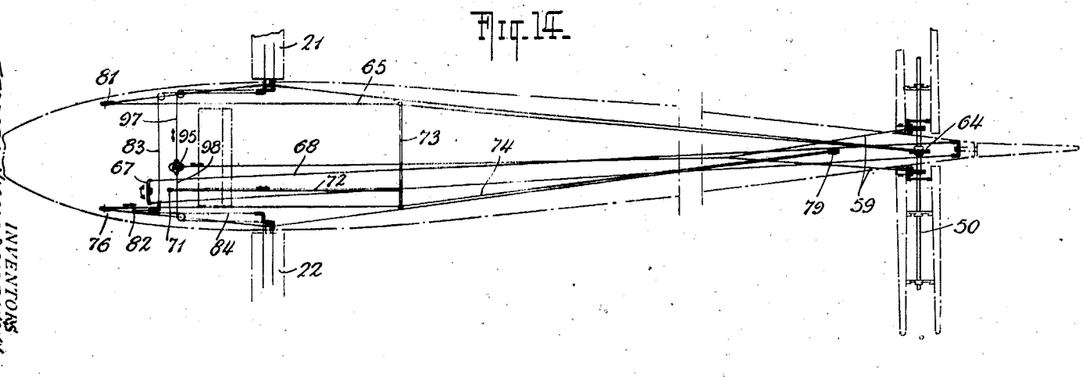
Figure 14 is a similar view in top plan.

The control of the aeroplane with respect to any turning movement about a horizontal transverse axis, as, for instance, when the nose of the machine dips, is accomplished by manipulation of the rear sets of wings 23 to 26. These wings are supported by a rod 50 extending transversely through the tail of the fuselage and the wings of each pair and normally set in downwardly diverging relation to each other, as best shown in Figure 8, the amount of inclination of the wings relative to the vertical being about two degrees. In this description, it is to be understood that where any reference is made to the vertical position, or angles thereto, of the various parts, such as the rear wings now being described in detail, there is meant a position which said parts would assume provided the aeroplane were absolutely stabilized in a horizontal plane, or, in other words, a reference to a vertical position is intended to describe a perpendicular position relative to the longitudinal axis of the aeroplane. The inner surfaces of each pair of wings are connected by a plurality of links 51 keyed, intermediate their ends, to the rod 50 and having their extremities pivotally connected at 52 to the respective wings. The wings of each pair are also joined, adjacent their inner ends, by means of a connecting link 53, one end of which is pivotally connected to one of the wings below the rod 50 while the other end of the connecting link is pivoted to the opposed wing at a point above said rod. The various connecting links 51 and 53 maintain the wings in proper relationship and at the same time permit of both a relative adjustment of the wings of each pair and also a unitary movement of each pair about the rod as an axis so that the wings may be moved from their substantially vertical positions to various angles of inclination, as indicated in dotted lines in Figure 4.

During upward flight, should the tail of the fuselage rise above the nose it is desirable to effect an adjustment of the pairs of wings 23, 24 and 25, 26 to increase the angle of deviation therebetween whereby more of the outer surfaces of the wings are presented to the air current from the propeller 29. This increase in the area of the wings proportionately increases the amount of air pressure against said wings and hence causes the tail of the machine to be lowered until the proper level is obtained. Also, in case the tail of the machine should drop horizontal stabilization may be obtained by a movement of the wings from their normal slight angles of deviation to absolute vertical planes, or, in other words, planes perpendicular to the longitudinal axis of the machine, so that the wings will offer an absolute minimum resistance to the air current from the propeller 29, thereby permitting the tail of the fuselage to again rise to the level of the nose.

The adjustment of the wings of each pair relative to each other is controlled through a lever 54 associated with each pair and carrying a segment 55 in mesh with a gear 56 loose on the rod 50 and adapted for sliding movement thereon. The gear 56 in turn meshes with a segment 57 connected to the forward wing of the pair so that when the gear 56 is turned in a counterclockwise direction, as viewed in Figure 9, by a forward pull upon the lower end of the lever 54 the wing 25, or 23 as the case may be, is swung about its pivot 52 to move the lower edge of the wing forwardly so as to increase the angle of the wing with respect to the vertical. This movement of the wing 25 is imparted, through the link connection 53, to the other wing 26 so as to move the lower edge of the latter wing rearwardly, thereby increasing the angular relation between the two wings and hence increasing the effective surfaces of the wings which are presented to the current of air from the propeller 29. The above described movement of the lever 54 is accomplished against the tension of the spring 58 and when the pull on the wire 59 connected to said lever is released, said spring will restore the lever 54 to its normal position. If it is desired to permit the pairs of wings to assume precise vertical positions with respect to the longitudinal axis of the machine, the wire 59 is slackened and the spring 58 will then pull the lever 54 rearwardly to effect a reversal of the movements of the wings with the result that the lower edges thereof are moved toward each other.

It will thus be seen from the foregoing description that during the upward vertical flight of the machine the same may be kept in a state of equilibrium by the manipulation of controls later to be described which effect adjustments of the wings 23 to 26, the rudder 30 and the ailerons 45. After obtaining the desired elevation for the machine the same can now be driven forwardly or backwardly in a horizontal plane by utilizing currents of air from the various propellers in combination with the wings 21 to 26. By simultaneously adjusting the wings 21, 22 and 23 to 26 about their respective axes 32 and 50, the angles of the wings with respect to the vertical may be set to the desired degree. It is estimated that to secure forward or backward propulsion the wings need not be adjusted to angles in excess of twenty-one degrees to obtain the desired results, it being understood, of course, that said wings may be pitched to intermediate angles to effect propulsion in a horizontal direction. For example, with the wings in the full line position shown in Figure 4, the rear surfaces thereof are presented to the air currents from the various propellers 27, 28 and 29 and the pressure of the air against the wings will propel the machine forwardly. With the wings adjusted to the forward dotted line positions the pressure of the air against the front surfaces thereof will cause a rearward movement of the aeroplane. The wings are also capable of adjustment to the substantially horizontal position indicated in dotted lines, this adjustment being effected for gliding purposes in cases of emergency such as stalling of the motor.

Before adjusting the rear wings 23 to 26 for forward or backward propulsion it is desirable to disconnect the gears 56 from engagement with the gear segments 55, and for this purpose said gears 56 have wires 60 connected thereto so that a pull upon said wires will slide the gears 56 inwardly a distance sufficient to disengage the segments 55 but still remain in engagement with the segments 57. Each gear 56 is provided with a clutch face 61 which engages a similar clutch face 62 fixed to the rod 50 when the gear 56 has been drawn inwardly against the tension of the spring 63. In this manner, the gears 56, which are free to revolve about the rod 50 when in their normal positions, will be locked to the wings through the segments 57 and said wings will be permitted to move as a unit about the rod 50 while maintaining their relationship to each other. To accomplish this unitary turning movement the rod 50 carries, within the fuselage, a pulley 64 around which is passed a wire 65. This wire has the ends of the wires 60 opposite to those connected to the gears 56 joined thereto so that when the wire 65 is operated to turn the pulley 64 in the desired direction a pull is at the same time exerted upon said wires 60. The latter have resilient means 66 interposed between their ends to permit stretching of said wires when a pull upon the wire 65 is effected which is in excess of that necessary to engage the clutch faces of the gears 56 with the clutches 62. The pulley 64 being fixed to the rod 50 will cause said rod to turn when a pull is exerted upon the wire 65 and thus the two sets of wings 23 to 26 are turned in the desired direction about the rod 50 as an axis. At the same time, the front wings 21 and 22 are also turned in a manner now to be described.

Reference is now made to Figures 13 to 16 in which one arrangement of the various controls is shown, but it is to be expressly understood that the construction shown and illustrated in said figures may be varied without departing from the spirit or scope of the invention.

The control for the rudder 30 comprises a foot-operated lever 67 to the ends of which are connected the ends of a wire 68 which is extended into the tail of the fuselage and around the pulleys 69 to the pulley 70 carried by the shaft 31 of the rudder. Thus, by pressing upon either end of the lever 67, it will be apparent that the pulley 70 may be rotated in the desired direction to adjust the rudder 30. The simultaneous control for the front and rear wings shown in Figure 15 will now be described. This control is effected through the medium of a lever 71 having a longitudinal rod 72 extending rearwardly from the lower end thereof and provided at its rear extremity with a cross rod 73. Connected to one end of the cross rod is a wire 74 which extends forwardly therefrom and around the pulleys 75 and 76 and thence rearwardly to the wing 22 where it is attached to an extension 77 projecting inwardly from the inner end of the wing through an arcuate slot 78 formed in the side of the fuselage. From this point the wire 74 extends rearwardly around a pulley 79 and thence forwardly to said end of the cross rod 73. The opposite end of said cross rod is connected to the endless wire 65, previously described, which extends forwardly and about pulleys 80 and 81 and then rearwardly to the wing 21 to which it is connected in the same manner that the wire 74 is connected to the wing 22. From the wing 21 and cross rod 73 the wire 65 extends rearwardly through the fuselage and is crossed at an intermediate point before extending around the pulley 64 on the rod 50. With this arrangement, when the lever 71 is pulled rearwardly, it will be obvious that the wings 21 and 22 will be swung rearwardly about their pivots and that the pulley 64 will be rotated in the proper direction to similarly adjust the rear wings 23 to 26.

Figures 15, 16:
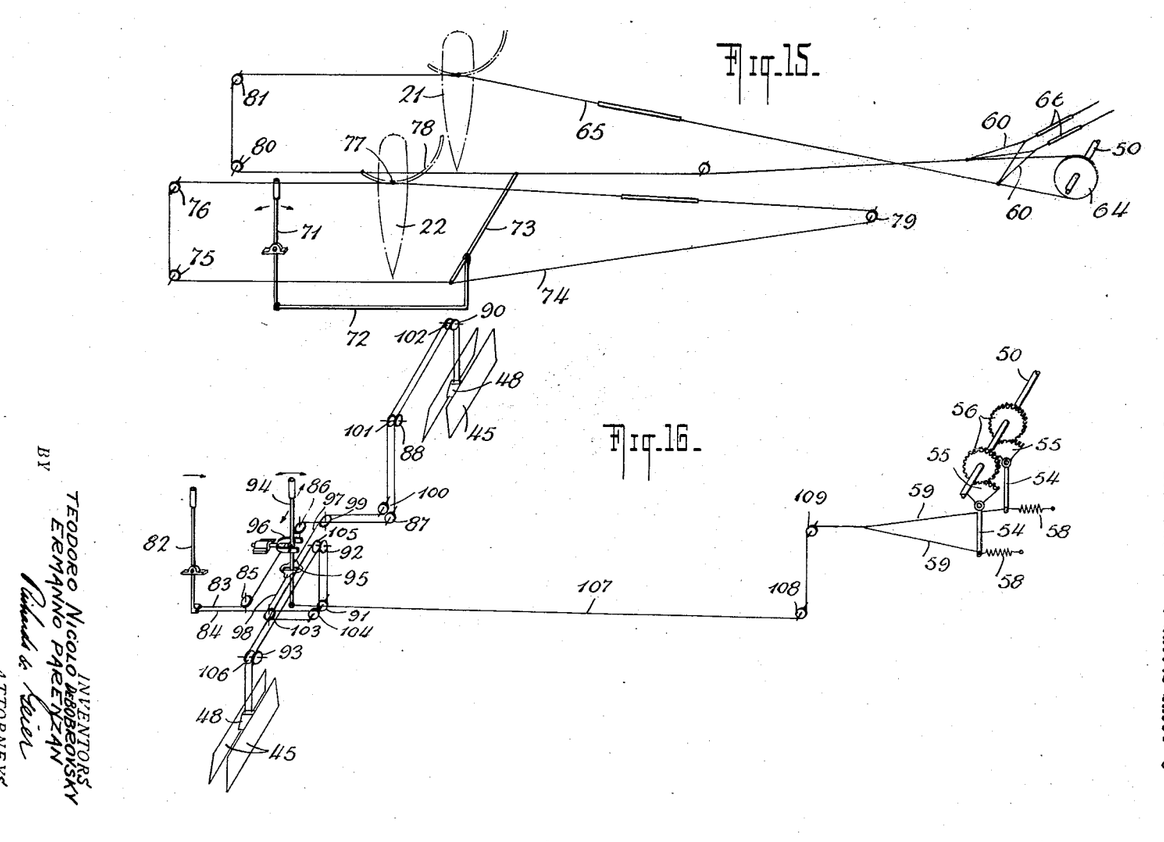
Figure 15 is a diagrammatic perspective view of the controls for simultaneously adjusting the front and rear wings about their respective axes.
Figure 16 is a similar view of the controls for adjusting the rear wings relative to each other and for accomplishing the simultaneous and individual adjustments of the pairs of ailerons in the front wings.

In Figure 16 there is shown one mode of execution for accomplishing the adjustment of the pairs of ailerons 45 and the relative adjustment of the wings of the pairs 23, 24 and 25, 26. The ailerons 45 are all adapted for simultaneous adjustment and also one pair of said ailerons may be adjusted relative to the other. The simultaneous adjustment is accomplished through the lever 82 to the lower end of which are connected two wires 83 and 84. The wire 83 extends around pulleys 85, 86, 87, 88 and 90 and from the latter pulley, which is located within the sleeve 32 of the right-hand wing 21, downwardly to the spreader 48. The wire 84 extends around pulleys 91, 92 and 93 and thence downwardly to the spreader 48 associated with the pair of ailerons in the left-hand wing 22. By pulling rearwardly upon the lever 82 it will be apparent that the spreaders 48 in both wings will be lifted against the tension of the springs 49 and this movement of the spreaders will cause the pairs of ailerons in both wings to be moved outwardly, as indicated in dotted lines in Figure 12.

In order to adjust one pair of ailerons without affecting the other, as is done when the machine turns about its longitudinal axis, there is provided a lever 94 having both front and rear movements and side movements in opposite directions. The side movements of the lever are utilized to effect the individual controls of the pairs of ailerons. For this purpose the lever 94 carries a slotted plate 95 below the gimbal 96 and to opposite sides of said plate there are connected the wires 97 and 98. The wire 97 is extended around pulleys 99, 100, 101 and 102 to the spreader 48 of the right-hand wing 21 so that a lateral pull upon the lever 94 in the direction of the left-hand wing will cause the wire 97 to lift the spreader 48 of the wing 21 and thus operate the ailerons in said wing. In a like manner the wire 98 is connected to the spreader 48 of the wing 22 by being extended around pulleys 103, 104, 105 and 106 so that a lateral movement of the lever 94 toward the wing 21 will cause the ailerons 45 of the wing 22 to be actuated.

The forward and backward movements of the lever 94 are utilized to control the adjustments of the wings of each pair 23, 24 and 25, 26 relative to each other. To this end, the lower end of the lever 94 has connected thereto one end of the wire 107 which is extended about pulleys 108 and 109 and has its rear end connected to the two wires 59 which are joined to the lower ends of the levers 54, one of which is associated with each of the pair of wings on opposite sides of the fuselage. Thus a rearward pull upon the lever 94 will simultaneously operate the levers 54 to increase the degree of inclination of the rear wings of each pair relative to each other. Should it be desired to adjust the wings from their normal slightly inclined positions to vertical positions a slight forward movement of the lever 94 will slacken the wire 107 and permit the springs 58 connected to the lower ends of the levers 54 to pull the latter rearwardly.

What is claimed is:

1. In an aeroplane, a fuselage, propellers for driving the aeroplane vertically upward, wings below said propellers movable to positions to utilize the air currents therefrom to drive the aeroplane horizontally, certain of said wings having normal downwardly diverging positions relative to each other, and means to vary the position angle of divergence of the latter wings during upward flight to change the surface resistance thereof with respect to the air current from an adjacent propeller whereby to maintain said fuselage in a horizontal plane.

2. In an aeroplane, propellers for driving the aeroplane vertically upward, wings below said propellers movable to positions to utilize the air currents therefrom to drive the aeroplane horizontally, means to vary the position of certain of said wings relative to each other during upward flight to change the surface resistance thereof with respect to the air current from an adjacent propeller whereby to maintain the body of the aeroplane in a horizontal plane, ailerons for the other wings, and means to adjust said ailerons to effect a turning movement about the longitudinal axis of the aeroplane.

3. In an aeroplane, propellers for driving the aeroplane vertically upward, wings below said propellers movable to positions to utilize the air currents therefrom to drive the aeroplane horizontally, means to vary the position of certain of said wings relative to each other during upward flight to change the surface resistance thereof with respect to the air current from an adjacent propeller whereby to maintain the body of the aeroplane in a horizontal plane, and means associated with the other wings to secure stabilization of the aeroplane relative to a turning movement about its longitudinal axis.

4. In an aeroplane, propellers for driving the aeroplane vertically upward, wings below said propellers movable to positions to utilize the air currents therefrom to drive the aeroplane horizontally, means to vary the position of certain of said wings relative to each other during upward flight to change the surface resistance thereof with respect to the air current from an adjacent propeller whereby to maintain the body of the aeroplane in a horizontal plane, ailerons for the other wings, means to adjust said ailerons to effect a turning movement about the longitudinal axis of the aeroplane, and a rudder beneath one of said propellers adjustable to vary the surface resistance thereof to the air current from said propeller to control the movement of the aeroplane about a vertical axis.

5. In an aeroplane, a fuselage, front and rear sets of wings having substantially vertical positions, the front set including a wing on each side of said fuselage and the rear set including a pair of wings on each side of said fuselage, propellers positioned closely above said wings, and means to adjust said sets of wings at angles relative to their vertical positions to present varying areas of said wings to the air currents from said propellers.

6. In an aeroplane, a fuselage, front and rear sets of wings having substantially vertical positions, the front set including a wing on each side of said fuselage and the rear set including a pair of wings on each side of said fuselage, propellers positioned closely above said wings, means to adjust said sets of wings at angles relative to their vertical positions to present varying areas of said wings to the air currents from said propellers, and means to adjust the pair of wings of each rear set relative to each other.

7. In an aeroplane, a fuselage, front and rear sets of wings having substantially vertical positions, said rear set including a pair on each side of said fuselage, propellers positioned closely above said wings, means to adjust said sets of wings at angles relative to their vertical positions to present varying areas of said wings to the air currents from said propellers, and a rudder below one of said propellers and disposed between said pairs of rear wings, said rudder being mounted for turning movement on a horizontal axis.

8. In an aeroplane, a fuselage, front and rear sets of wings having substantially vertical positions, propellers positioned closely above said wings, means to simultaneously adjust said sets of wings at angles relative to their vertical positions to present varying areas of said wings to the air currents from said propellers, means to adjust the wings of one set relative to each other to vary the angle of deviation therebetween, and a rudder below one of said propellers mounted for turning movement on a horizontal axis.

9. In an aeroplane, a fuselage, hollow wing supports extending from opposite sides thereof, wings suspended from said supports in vertical planes from their upper edges and movable about such supports as axes toward horizontal planes, propellers mounted above said wings, and driving means for said propellers extending through said supports.

10. In an aeroplane, a fuselage, wing supports extending from opposite sides thereof, wings suspended from said supports from their upper edges and having opposed surfaces, propellers mounted above said wings, an aileron in each surface of each wing, and means between and engageable with said ailerons to move the same outwardly beyond their respective surfaces.

11. In an aeroplane, a fuselage, pairs of wings supported on opposite sides thereof in substantially vertical positions, a propeller above said pairs of wings, means to adjust the wings of each pair to different angles of inclination relative to each other, and means to adjust the wings of both pairs about a common axis extending transverse to said fuselage.

12. In an aeroplane, a fuselage, pairs of wings supported on opposite sides thereof in substantially vertical positions, a propeller above said pairs of wings, means to adjust the wings of each pair to different angles of inclination relative to each other, means to adjust the wings of both pairs about a common axis extending transverse to said fuselage, and a rudder mounted below said propeller for oscillation about a horizontal axis.

13. In an aeroplane, a fuselage, wings suspended in vertical positions on opposite sides thereof from their upper edges and having opposed surfaces, ailerons pivotally mounted in said surfaces and spaced from the marginal edges of said wings, and means to swing the ailerons in each wing outwardly with respect to the surface to which they are connected.

14. In an aeroplane, a fuselage, tubular wing supports extending on opposite sides thereof, wings suspended from said supports from their upper edges, a source of power located between said wings, propellers above said wings, and driving connections between said source and propellers extending through said tubular supports.

In testimony whereof, we have affixed our signatures.

TEODORO NICOLO DE BOBROVSKY.
ERMANNO PARENZAN.